US010787781B2

(12) United States Patent
Fiske et al.

(10) Patent No.: US 10,787,781 B2
(45) Date of Patent: Sep. 29, 2020

(54) MARINE AND RIVER PROTECTION SYSTEM AND METHOD OF SUPPORTING COASTAL STRUCTURES

(71) Applicant: TENSAR INTERNATIONAL CORPORATION, Alpharetta, GA (US)

(72) Inventors: Jeffrey Fiske, Alpharetta, GA (US); Kord J. Wissmann, Alpharetta, GA (US)

(73) Assignee: Tensar International Corporation, Alpharetta, GA (US)

( * ) Notice: Subject to any disclaimer, the term of this patent is extended or adjusted under 35 U.S.C. 154(b) by 0 days.

(21) Appl. No.: 16/332,847

(22) PCT Filed: Sep. 14, 2017

(86) PCT No.: PCT/US2017/051503
§ 371 (c)(1),
(2) Date: Mar. 13, 2019

(87) PCT Pub. No.: WO2018/053088
PCT Pub. Date: Mar. 22, 2018

(65) Prior Publication Data
US 2019/0218736 A1 Jul. 18, 2019

Related U.S. Application Data

(60) Provisional application No. 62/394,410, filed on Sep. 14, 2016.

(51) Int. Cl.
E02B 3/12 (2006.01)
E02D 29/02 (2006.01)
E02D 31/00 (2006.01)

(52) U.S. Cl.
CPC .............. E02B 3/127 (2013.01); E02D 29/02 (2013.01); E02D 31/00 (2013.01); Y02A 10/35 (2018.01)

(58) Field of Classification Search
CPC .......... E02B 3/127; E02D 29/02; E02D 31/00
See application file for complete search history.

(56) References Cited

U.S. PATENT DOCUMENTS 4,594,206 A * 6/1986 Grafton .................... E02B 3/06
264/257
5,115,602 A 5/1992 De Larrard
(Continued)

Primary Examiner — Benjamin F Fiorello
(74) Attorney, Agent, or Firm — Nexsen Pruet, PLLC; E. Eric Mills

(57) ABSTRACT

A thin erosion control mattress system and method of protecting coastal structures and riverbanks against bearing failure and erosion from waves and current is disclosed. The thin mattress system includes geotextile fabric bonded to a tensile element (such as geogrid) and sand/gravel or other fill material confined in the mattress with connection elements (such as rivets) at specific intervals. The geogrid, which can be biaxial or multi-axial, provides tensile strength for picking during installation, improving foundation support and rigidity to the mattress system. The rivets function as spacers and tension elements to prevent bulging of the mattress, and are designed and spaced to temporarily secure the mattress in place for uniform filling and installation. The bonded geotextile-geogrid mat is typically sewn on all sides and filled with sand or gravel at designated fill ports. Further, a method of fabricating the thin mattress system is provided.

13 Claims, 6 Drawing Sheets

(56) References Cited

U.S. PATENT DOCUMENTS

| | | | | |
|---|---|---|---|---|
| 5,632,571 | A | * | 5/1997 | Mattox ............... B28B 23/0012 |
| | | | | 405/19 |
| 5,902,070 | A | | 5/1999 | Bradley |
| 6,053,662 | A | | 4/2000 | Scuero |
| 7,838,771 | B2 | * | 11/2010 | Dalaine ................... F16L 1/032 |
| | | | | 174/93 |
| 8,657,529 | B2 | * | 2/2014 | Ohkubo .................. E02D 15/10 |
| | | | | 405/154.1 |
| 9,011,005 | B2 | * | 4/2015 | Lin ........................ B65D 33/00 |
| | | | | 114/27 |
| 2004/0052583 | A1 | * | 3/2004 | Davis .................... E01F 15/086 |
| | | | | 405/19 |
| 2004/0101368 | A1 | * | 5/2004 | Daigle .................... E02B 3/123 |
| | | | | 405/19 |
| 2005/0170720 | A1 | * | 8/2005 | Christiansen ........ A01G 9/1438 |
| | | | | 442/1 |
| 2008/0264546 | A1 | * | 10/2008 | Olsta ................... E02D 29/0208 |
| | | | | 156/91 |
| 2009/0136297 | A1 | | 5/2009 | Ferraiolo |
| 2012/0219746 | A1 | | 8/2012 | Powell |
| 2014/0190111 | A1 | * | 7/2014 | Thomas ............. E02D 29/0241 |
| | | | | 52/576 |

\* cited by examiner

MARINE AND RIVER PROTECTION SYSTEM AND METHOD OF SUPPORTING COASTAL STRUCTURES

CROSS REFERENCE TO RELATED APPLICATIONS

This application is a 35 U.S.C. § 371 U.S. national phase entry of International Application No. PCT/US2017/051503 having an international filing date of Sep. 14, 2017, which claims the benefit of U.S. Provisional Application No. 62/394,410 filed Sep. 14, 2016, each of which is incorporated herein by reference in its entirety.

TECHNICAL FIELD

The presently disclosed subject matter relates generally to methods of protecting and stabilizing soil in a coastal or river environment and more particularly to a thin and confined erosion control mattress system for method of protecting coastal structures against bearing failure and erosion.

BACKGROUND

Coastal structures such as living shorelines, groins and dikes must be founded on a stable foundation to avoid bearing capacity failure and scour erosion due to waves and current. In riverbank and mid-river bridge pier applications, channelized side slopes and piers should be protected against scour from water flow that leads to streambank erosion and ground loss. There are many traditional techniques that are used to enhance foundation stability and to protect coastal, harbor, and riverbank structures from scouring including the placement of rip rap stone, the placement of combinations of rip rap and filter layers, the placement of articulated concrete blocks, and the placement of stone filled geogrid-confined mattresses.

The placement of stone "rip rap" is the most common form of coastal revetment. Design guidelines for rip rap provided by The Rock Manual (Circa 1991) stipulate that the weight of the individual stones is greater than the drag force exerted on the stones by laterally moving hydraulic current. Thus, the higher the current forces, the larger the requirement for stone particle size and the more expensive the stone. Further, because the diameter of the rip rap pieces is significantly larger than the particle sizes of the earthen materials being protected, the hydraulic forces that act on the rip rap also result in the interparticle internal scouring of the base earthen materials into and through the rip rap layer. In below-water level applications, the placement of rip rap is a somewhat random affair because it is difficult to see where the stone is placed and difficult to place a uniform bed of stone. What is needed is a scour protection layer that prevents internal erosion and allows for the use of smaller particle sizes in the placed revetment and may be placed at correct locations easily below the water level.

One means to protect rip rap layers against internal scouring is by placing a layer of geotextile fabric below the rip rap layer during construction. The fabric is designed to allow for the passage of water but the retention of soil particles. This operation is effective for materials placed above the water level. In below-water applications, however, the geotextile filter layer is not easily placed because it tends to be easily displaced by the moving current. Further, the friction angle between the rip rap and the filter layer is often less than that for the rip rap/stone interface causing localized sliding if the rip rap is placed on a steepened slope. What is needed is a scour protection layer that prevents internal erosion and is easily placed below water.

Another means to form foundations below coastal structures and to protect river channels and bridge piers from scour is the use of a stone filled geogrid encapsulated mattress. The mattress consists of plastic geogrids that form the boundaries of the mattress and is used to encapsulate and add tensile strength to the placed layer. The inner cells of the mattress are partitioned with baffles to prevent the infill stone from flowing entirely to one end or another during "picking" with a crane. The stone used in the mattress is typically on the order of 1 inch to 4 inches in diameter, thus requiring that the mattresses be a minimum of 6 inches thick. The advantage of this construction is that the mattresses may be placed at exact locations below water and that the tensile strength of the geogrid reduces the tendency of the mattress in fill stone to scour. Further the geogrid tensile strength increases the bearing capacity stability and the side slope stability of placed layers relative to rip rap. The thickness and unit weight of the stone, however, causes the mattress to weigh 60 to 400 pounds per square foot of area coverage, a weight that results in the requirement of heavy equipment and large cranes for picking, lifting, and placement. Thus the cost of placement depends more on the implementation of the construction equipment required for handling than it does on the mattress materials. What is needed is a lighter revetment that may be handled more easily by lighter equipment yet retains the tensile strength advantages.

SUMMARY OF THE INVENTION

One aspect of the disclosure consists of a unique combination of a tensile element component (e.g., geogrid), a geotextile component, fill media (e.g., sand), and interspersed connection elements (e.g., rivets) that allow for the construction of thin (e.g., 1 to 2 inches in thickness) erosion control layers that may be placed at uniform thickness and with confidence below water. A further aspect of the present disclosure is directed to a composite material comprising an outer layer of geogrid that retains an inner geotextile filter fabric that in turn retains fill material, which may include sand fill, rock, gravel, aggregate, soil, commercial byproducts (ash, slag, etc.), recycled material (glass, polymer chips, etc.), activatable/reactive materials (bentonite, bioremediate, etc.), or the like. In one aspect, the sand comprises ¼-inch diameter quarry run sand that is easily obtained and may be placed within the composite layer using either dry or wet filling methods. In another aspect, the sand fill is retained by a geotextile designed to retain the sand particles from moving but with sufficient permittivity to allow for the free flow of water. In another aspect, the geotextile layers are retained by a layer of geogrid that provides tensile strength important for picking, placement, overall integral stability, and scour protection. A uniform thickness is preferably maintained by the addition of a grid of rivets that are important during placement but typically serve only as a sacrificial function for construction. Aspects of the present disclosure have the advantage that the disclosed erosion control layers are lightweight, approximately 3 to 15 pounds per square foot once filled, thus requiring much lighter construction equipment for placement. The invention includes its own internal scour prevention layer, thus preventing internal erosion. The invention further retains high strength that is provided by the high tensile strength geogrids that provide tensile strength for bearing capacity, side slope stability, and hydraulic erosion control applications.

BRIEF DESCRIPTION OF THE DRAWINGS

Figure 1:
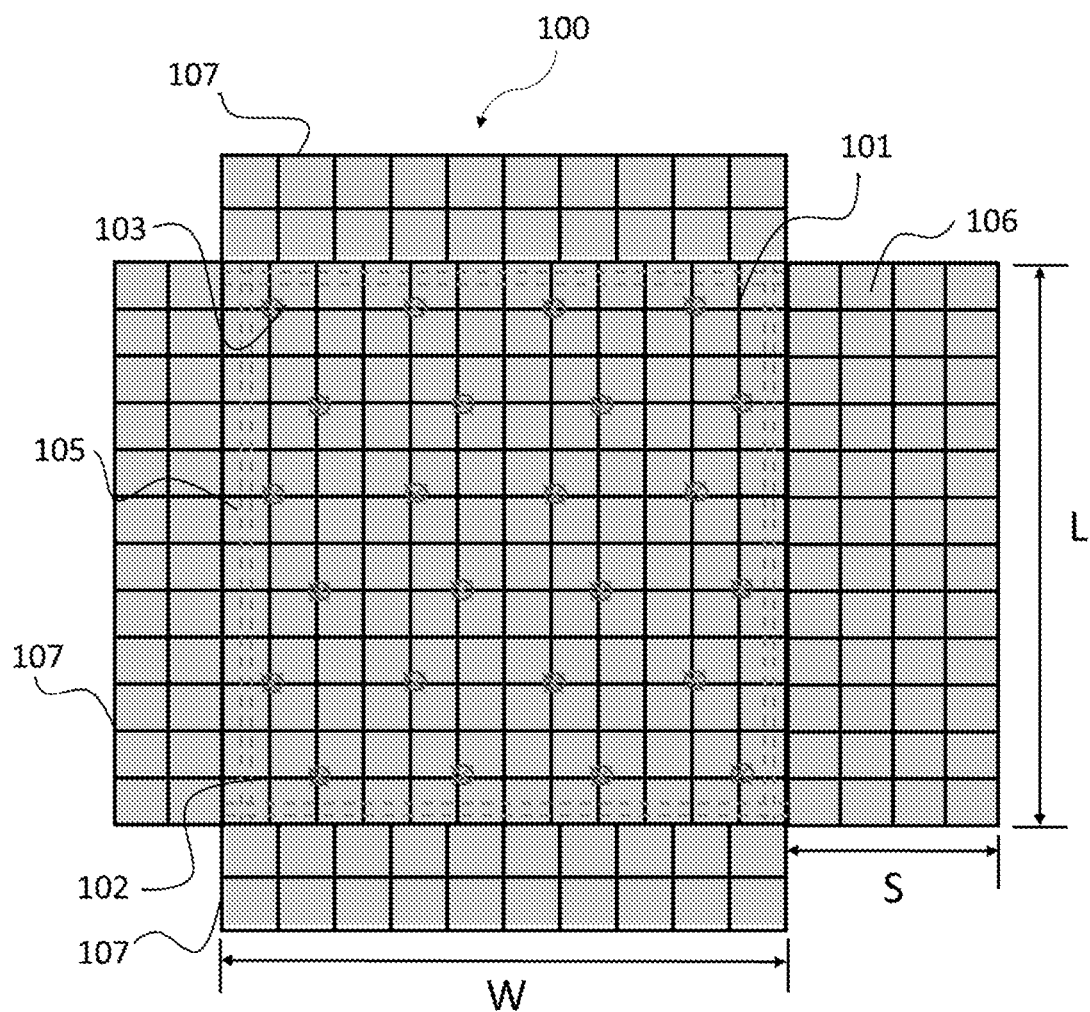
Figure 2:
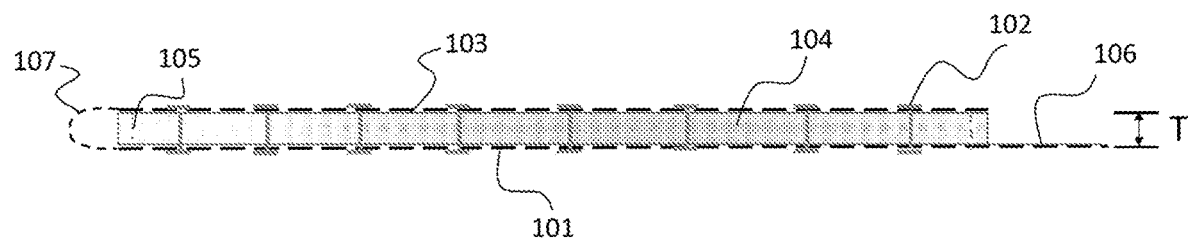

Having thus described the presently disclosed subject matter in general terms, reference will now be made to the accompanying Drawings, which are not necessarily drawn to scale, and wherein:

FIG. 1 illustrates a top down perspective view of a presently disclosed sand filled thin erosion control mattress system secured on the perimeter with specialty stitching for supporting foundation of coastal structures against bearing and erosion due to waves and current;

FIG. 2 illustrates a cross-section view of the overall mattress system of FIG. 1

Figure 3:
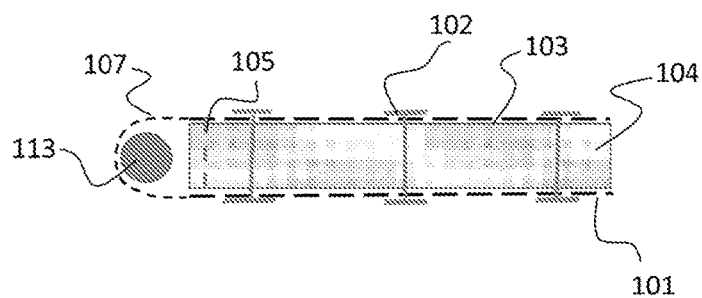
Figure 4:
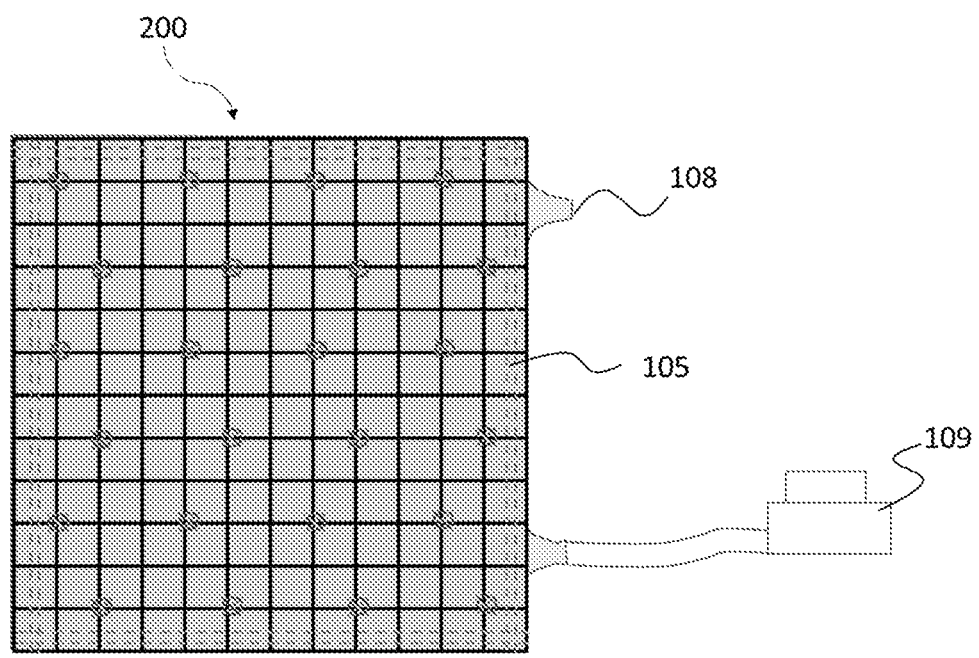
Figure 5:
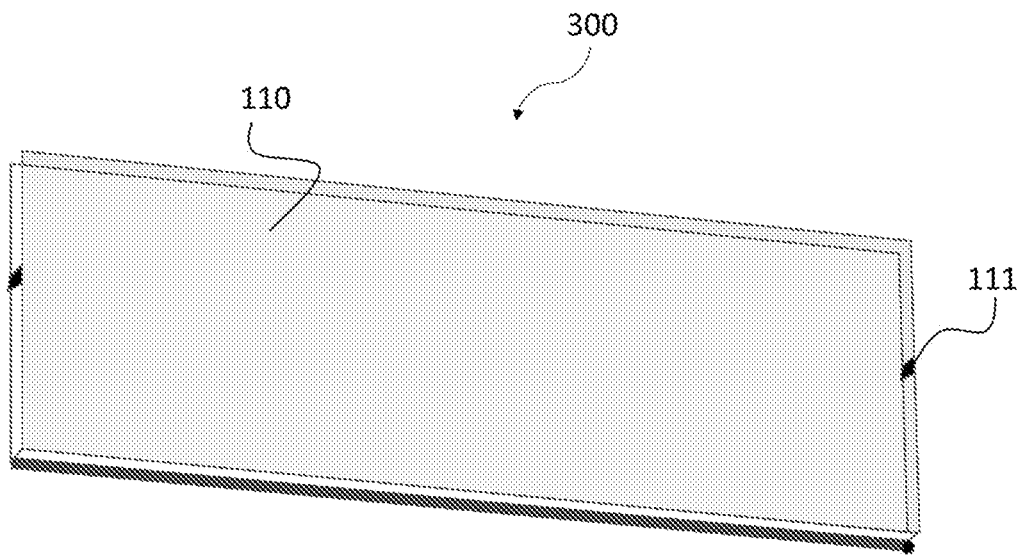
Figure 6:
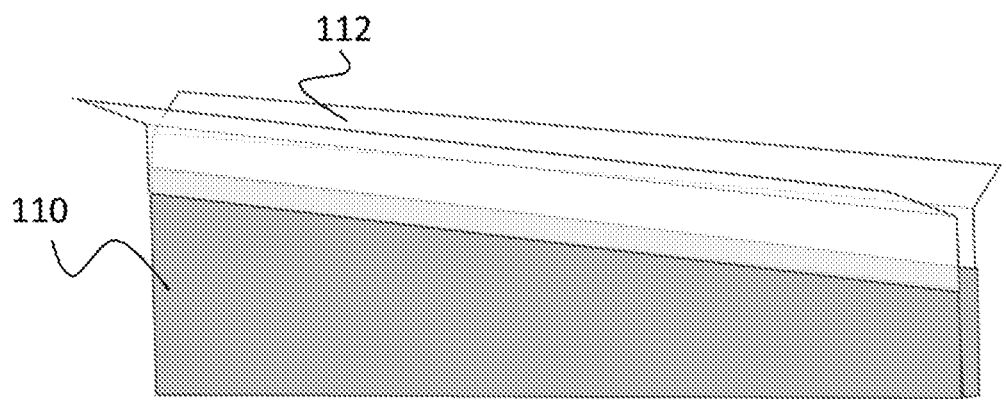
Figure 7:
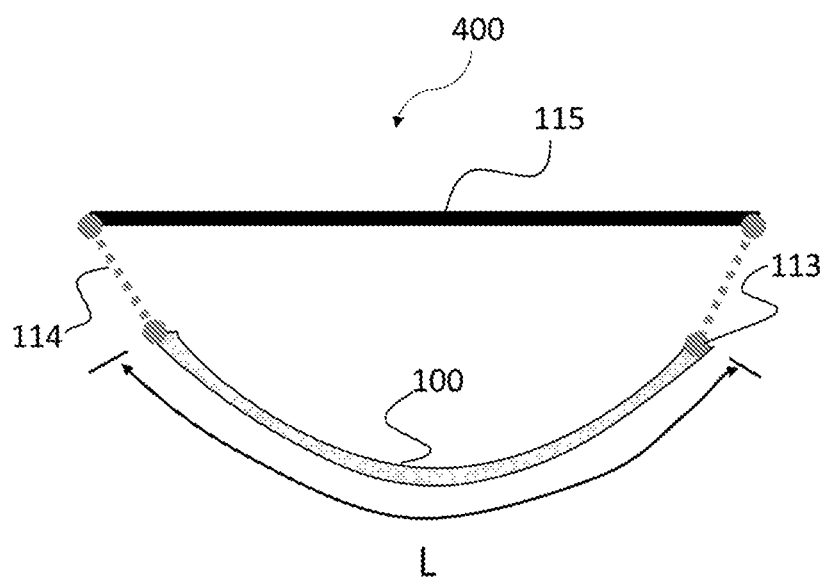
Figure 8:
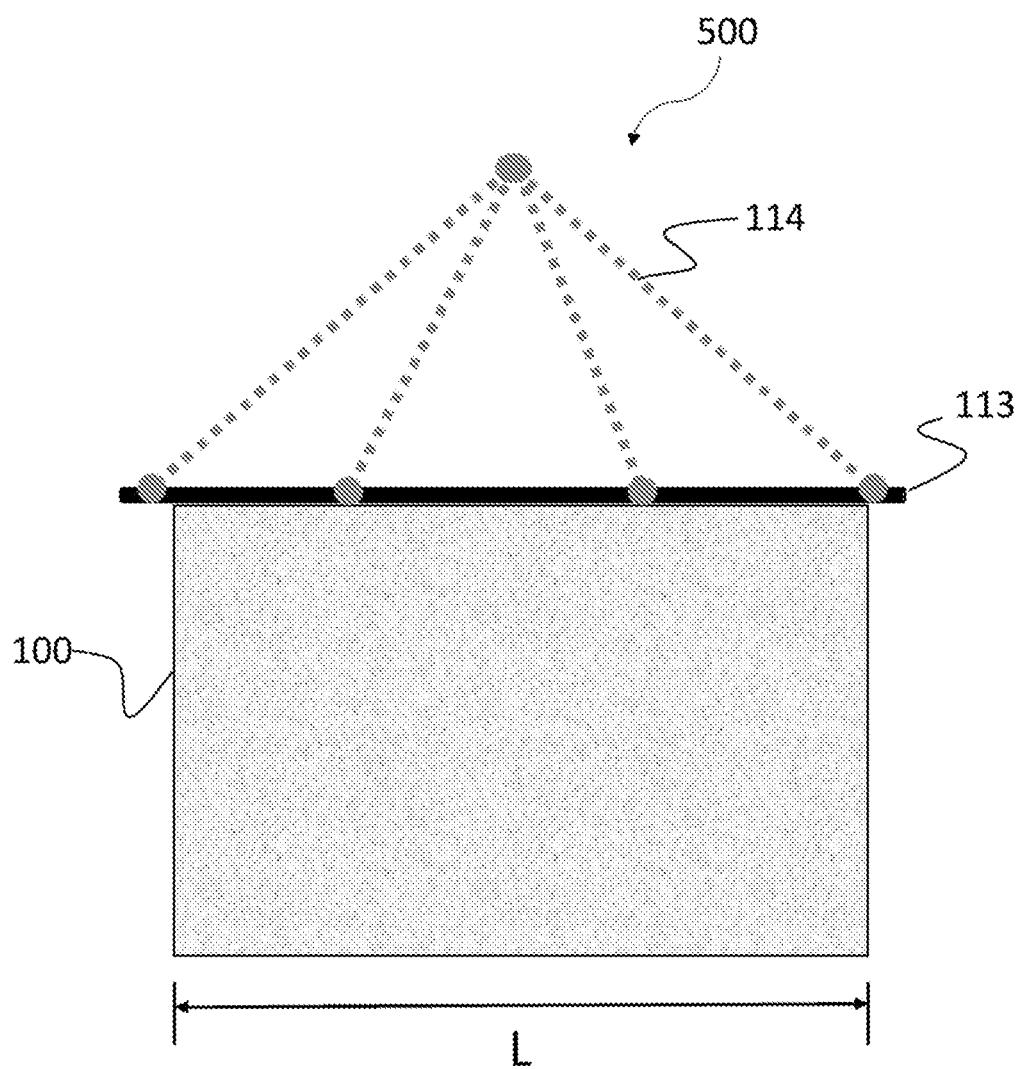

FIG. 3 illustrates a cross-section view of an expanded view of a portion of the thin mattress system of FIG. 2 and showing more details thereof;

FIG. 4 illustrates an example of a method filling operation of the presently disclosed thin mattress system for supporting foundation of coastal structures against bearing and erosion due to waves and current;

FIGS. 5 and 6 illustrate an example filling frame for filling the mattress system; and FIGS. 7 and 8 illustrate a completed mattress being lifted.

DETAILED DESCRIPTION

The presently disclosed subject matter now will be described more fully hereinafter with reference to the accompanying Drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

In some embodiments, the presently disclosed subject matter provides a thin mattress system and method of supporting the foundation of coastal structures against bearing instability and erosion from waves and current. The presently disclosed apparatuses are directed to thin geotextile confined sand mattresses comprising fill material (such as sand fill), layers containing a geotextile fabric to contain the infill material and an external geogrid to provide tensile strength required for placement and to provide overall comprehensive stability, and a network of interspersed rivets to hold the mattress and fill together and to provide for a substantially uniform thickness.

The geogrid, which could be biaxial or multi-axial, provides tensile strength for picking during installation, improving foundation support and rigidity to the mattress system. The rivets are designed and spaced to secure the mattress together for substantially uniform filling and installation. According to one aspect, the geotextile and geogrid mat are sewn together at the perimeter and at the filling ports once it is filled with sand or gravel.

The presence of the thin mattress system protects the coastal structures or riverbank against bearing failure and erosion from waves and current. Namely, the presence of the thin mattress system according to the present disclosure substantially improves the foundation stability of coastal structures as compared to a coastal structure installed on a foundation absent the presently disclosed thin mattress system.

An aspect of the presently disclosed thin mattress systems and methods is that the systems can be used to help prevent erosion around the foundation of coastal structures and riverbank slopes from waves and current action.

Another aspect of the presently disclosed thin mattress systems and methods is that they facilitate more efficient installation compared with conventional methods of dumping loose stone on top of geotextile secured on steel frame, and barging and lifting of heavy marine mattress with a heavy and specialty crane.

Another aspect of the presently disclosed thin mattress systems and methods is directed to providing a level and even surface for coastal structures to be founded on the ground.

Another aspect of the presently disclosed thin mattress systems and methods allows the mattress systems to be fabricated away from typically space constrained project sites, and provides for significantly more square footage of product that can be loaded, for example, onto a barge for near shore installation without the need to dredge a floatation channel.

Yet another aspect of the presently disclosed thin mattress systems and methods allows for construction to proceed in shallow water environments as a result of the reduced weight and consequent hoisting requirements for picking and the reduced vessel draft that corresponds to the lighter placement needs.

Referring now to FIG. 1, an illustration is provided showing an overhead plan view of an example of the presently disclosed thin mattress system 100 for protecting coastal structures or riverbank against foundation bearing failure and erosion from waves and current. The thin mattress system 100 typically includes geotextile fabric 103 sandwiched between panels of biaxial or multi-axial geogrid 101.

The geotextile fabric 103 acts as a filter media and confines the fill material, which may include sand fill, rock, gravel, aggregate, soil, commercial by-products (ash, slag, etc.), recycled material (glass, polymer chips, etc.), activatable/reactive materials (bentonite, bioremediate, etc.), or the like, in the mattress system 100. The geogrid 101 can be, for example, Tensar® Biaxial Geogrid or Triax® Geogrid available from Tensar International Corporation (Alpharetta, Ga.). Tensar® Triax® is a geogrid formed of polypropylene and provides the needed tensile capacity to support and provide stability to the coastal structures foundation.

A single layer of geotextile fabric 103 and geogrid 101 of mattress 100 typically extends 2 feet, distance S in FIG. 1 along the length L and across the width W as overlap panel 106. The overlap panel 106 is the overlap distance between two mattresses 100. The geogrid 101 also extends at two sides of the mattress 100 to form lifting tabs 107 for mattress 100 to be lifted and placed, for example, under water.

Connection elements, such as rivets 102 can be made of steel or polymer material, and can be installed between 6 inch to 12 inch spacing, acting as baffles or cells within the mattress system 100. The geotextile 103 and geogrid 101 mat is sewn together along the perimeter with, for example, 6,000 minimum denier thread 105. More details of the thin mattress system 100 are shown with reference to FIG. 2, FIG. 3, and FIG. 4.

The mattress 100 has a length L, a width W and a thickness T. The length of the mattress 100 can generally be 30 feet in a preferred embodiment. The width W of the mattress 100 can generally be 6.5 feet in a preferred embodiment. The thickness T of the mattress 100 can generally be from ½ inch to 3 inches, and in a preferred embodiment of 1 inch.

Referring now to FIG. 2, a cross-sectional side view is shown of the thin mattress system 100 of FIG. 1 and showing more details thereof. The mattress system includes two panels of geogrid 101 and two panels of geotextile fabric 103 sewn together at the perimeter with high denier thread 105. The steel or polymeric rivets 102 can generally be installed between 6 inches to 12 inches, and in a preferred embodiment of 12 inches. The rivets 102 function as spacers and tension elements to prevent bulging, and temporarily secure the panels of geogrid 101 and geotextile 103 during sand or gravel 104 placement operation.

Referring now to FIG. 3, the lifting tab 107 includes the geogrid 101 extended outside the sewn area on the mattress 100 from one end to the other and connected with High Density Polyethylene braid or otherwise incorporated into the mattress 100 via sewing 6,000 denier thread 105. A lifting bar 113, without limitation, can generally be steel rebar or steel pipe depending on the size and weight of the mattress 101.

Referring now to FIG. 4, the assembled mattress 200 is typically filled with fill material (such as sand or gravel, as an example) through designated fill ports 108 to complete the mattress system. The sand or gravel can generally be pumped into the fill ports 108 connected to a pump station 109.

Referring now to FIG. 5 and FIG. 6, the assembled mattress 100 may alternatively be filled on a filling frame 300 which can generally be made of expanded steel mesh 110 with safety latch 111 at both ends of the vertical frame. A "jig" 112 that forms a funnel at the top of the frame extends into the envelope of the mattress whereby the funnel facilitates the flow of dry sand (as an example) into the mattress cells.

Referring now to FIG. 7 the lifting mechanism 400 of the completed mattress generally includes the lifting bar 113, typically made of steel rebar or steel pipe connected to the lifting tabs 107 in FIG. 3, and lifted up with cables 114 at both end of the mattress on a spreader bar 115.

Referring now to FIG. 8, another way of lifting the completed mattress 500 is lifting along the length L of the mattress with lifting bar 113 connected to the lifting tab 107 shown in FIG. 3. The lifting bar would be lifted up with cables 114 connected across the length of the lifting bar.

Example 1

The present invention was considered for use as a foundation support layer for a living shoreline project in coastal Louisiana. The primary feature of the project was to be a series of oyster reef structures created by placing lime rock riprap on a geotextile and bedding stone under-layer. The project site was located in the tidal zone with mean high water level (MHWL) of 4 feet. Due to the shallow depth and lack of landside access, the project plans called for dredging of a flotation channel to allow access from the water side. The stone rip rap foundation originally considered was later rejected because of the difficulties associated with placing a uniform thickness layer. A stone filled geogrid encapsulated mattress was also considered. However, this option had the drawback that each 12 inch thick mattress weighed 95-100 pounds per square foot requiring the use of large cranes to hoist the geogrid mattresses and dredging at the site to a depth of 8-10 feet to facilitate barge access. The system of the current disclosure as described above was considered for the site in replacement of the traditional options. The sand-filled geotextile confined mattress was prefilled and then transported to the jobsite where it was loaded on 4-foot draft barges. Picking was facilitated with a small excavator rather than a large crane. The present subject matter allowed the completed project to be executed at a unit cost of $684 per linear foot, representing a 33% construction savings.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

We claim:

1. A confined fill erosion control mattress comprising:
   a) a first layer comprising an inner geotextile component engaged with an outer tensile element component disposed on a first externally-facing side of the first layer, a second layer comprising an inner geotextile component engaged with the outer tensile element component disposed on a second externally-facing side of the second layer opposite the first externally facing side, the first and second layers substantially sealed about a common perimeter to form a confined fill erosion control mattress, with said mattress comprising a predetermined amount of fill material;
   b) a plurality of interspersed connection elements connecting the first and second layers, and spaced to create intermediate cells within the mattress;
   c) an integral lifting bar in communication with the mattress for use in lifting operations; and,
   d) at least one lifting tab extending from said common perimeter and comprised of a loop formed by the outer tensile element component extending from the first externally facing side around to the second externally facing side and through which the lifting bar is disposed.

2. The confined fill mattress of claim 1, wherein the tensile element component comprises geogrid.

3. The confined fill mattress of claim 1, wherein the fill material comprises sand, rock, gravel, soil, commercial by-products, recycled materials, activatable/reactive materials, and combinations thereof.

4. The confined fill mattress of claim 1, wherein the connection elements comprises steel or polymeric rivets.

5. The confined fill mattress of claim 1, wherein the connection elements are spaced between 6 and 12 inches from one another to form the intermediate cells.

6. The confined fill mattress of claim 1, wherein the mattress is dimensioned to contain a predetermined amount of fill material.

7. The confined fill mattress of claim 6, wherein the mattress is dimensioned to contain a weight load ranging from about 3 lbs/ft$^2$ to about 15 lbs/ft$^2$ upon filling.

8. The confined fill mattress of claim 6 having a length dimension of approximately 30 feet, a width dimension of approximately 6.5 feet, and a thickness dimension of approximately 1 inch.

9. The confined fill mattress of claim 1, further comprising an overlap panel extending from said perimeter to create an overlap junction for use in setting multiple mattresses.

10. A method of protecting coastal and river environments and structures against bearing instability and erosion comprising:
    a) providing the confined fill erosion control mattress of claim 1;
    b) filling the confined fill mattress with fill material; and
    c) deploying the confined fill mattress to a predetermined location through utilization of the lifting bar.

11. The method of claim 10, wherein the step of filling the confined fill mattress involves filling through one or more fill ports provided in the perimeter.

12. The method of claim 11, wherein the fill port is an elongated envelope along the perimeter and wherein the step of filling the confined fill mattress involves the use of a filling frame and funnel, wherein the mattress is held within the frame while fill material is placed in to the envelope through the funnel.

13. The method of claim 10, wherein in the step of deploying the confined fill mattress to a predetermined location, said predetermined location is below water.

* * * * *